US010589595B2

(12) United States Patent
Schedel et al.

(10) Patent No.: US 10,589,595 B2
(45) Date of Patent: Mar. 17, 2020

(54) METHOD AND AIR CONDITIONING UNIT FOR AIR CONDITIONING AN INTERIOR OF AN ELECTRICALLY DRIVEN VEHICLE (71) Applicant: Bayerische Motoren Werke Aktiengesellschaft, Munich (DE)

(72) Inventors: Felix Schedel, Gauting (DE); Philipp Hofmann, Munich (DE); Oliver Horn, Munich (DE); Peter Satzger, Landsberg am Lech (DE); Markus Moser, Oberschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 23 days.

(21) Appl. No.: 15/453,665

(22) Filed: Mar. 8, 2017

(65) Prior Publication Data
US 2017/0174039 A1 Jun. 22, 2017

Related U.S. Application Data (63) Continuation of application No. PCT/EP2015/069206, filed on Aug. 21, 2015.

(30) Foreign Application Priority Data

Sep. 9, 2014 (DE) .................. 10 2014 217 959

(51) Int. Cl.
*B60H 1/00* (2006.01)
*B60L 1/02* (2006.01)
(Continued)

(52) U.S. Cl.
CPC ..... *B60H 1/00392* (2013.01); *B60H 1/00271* (2013.01); *B60H 1/143* (2013.01);
(Continued)

(58) Field of Classification Search
CPC . B60H 1/00271; B60H 1/00392; B60H 1/143
(Continued)

(56) References Cited

U.S. PATENT DOCUMENTS 6,808,372 B2  10/2004  Makino et al.
7,040,269 B2   5/2006  Dehrmann et al.
(Continued)

FOREIGN PATENT DOCUMENTS

CN   1391039 A   1/2003
CN   1437536 A   8/2003
(Continued)

OTHER PUBLICATIONS

PCT/EP2015/069206, International Search Report dated Nov. 27, 2015 (Two (2) pages).
(Continued)

*Primary Examiner* — Henry T Crenshaw
(74) *Attorney, Agent, or Firm* — Crowell & Moring LLP (57) ABSTRACT Temperature control of an interior of a motor vehicle having an electrical drive is carried out by a heat pump arrangement having a heating temperature region and a low temperature region, wherein the heating temperature region includes at least one interior heat exchanger thermally coupled to the interior and the low temperature region includes at least one of an exterior heat exchanger and a heat exchanger disposed on a component of the electrical drive. When the interior of the motor vehicle is be temperature-controlled, heat energy from the heating temperature region of the heat pump arrangement is delivered to the interior of the vehicle, and the operating point of the electrical drive is altered such that the generation of thermal losses is controlled in at least one electrical component of the electrical drive, such that the temperature of the low temperature region in the stationary or quasi-stationary operation is controlled at a level so as to
(Continued)

ensure that the heat pump arrangement can provide the heating energy.

14 Claims, 2 Drawing Sheets

(51) Int. Cl.
    *B60H 1/14*     (2006.01)
    *H02P 29/62*     (2016.01)
    *B60L 1/00*     (2006.01)

(52) U.S. Cl.
    CPC ............. *B60L 1/003* (2013.01); *B60L 1/02* (2013.01); *H02P 29/62* (2016.02); *B60L 2240/34* (2013.01); *B60L 2270/46* (2013.01); *Y02T 10/642* (2013.01)

(58) Field of Classification Search
    USPC .......................................................... 62/150
    See application file for complete search history.

(56) References Cited

U.S. PATENT DOCUMENTS

| | | | | |
|---|---|---|---|---|
| 2003/0034187 A1* | 2/2003 | Hisada | ............... | B60K 6/445 180/65.1 |
| 2009/0036263 A1* | 2/2009 | Iwase | ............... | B60K 6/445 477/3 |
| 2011/0095717 A1* | 4/2011 | Takizawa | ............... | B60L 1/06 318/473 |
| 2011/0139397 A1 | 6/2011 | Haussmann | | |
| 2012/0031140 A1* | 2/2012 | Zhang | ............... | B60K 11/02 62/498 |
| 2012/0081048 A1* | 4/2012 | Kalluf | ............... | H02K 17/26 318/400.09 |
| 2012/0085114 A1* | 4/2012 | Graaf | ............... | B60H 1/00278 62/238.7 |
| 2012/0318012 A1* | 12/2012 | Choi | ............... | B60H 1/00921 62/129 |
| 2013/0025311 A1 | 1/2013 | Graaf et al. | | |
| 2013/0199225 A1 | 8/2013 | Lee et al. | | |
| 2013/0205615 A1* | 8/2013 | Prud'Homme | ............... | F26B 21/10 34/480 |
| 2014/0069123 A1* | 3/2014 | Kim | ............... | F25B 5/04 62/61 |
| 2014/0158322 A1* | 6/2014 | Homann | ............... | F25B 29/003 165/61 |
| 2014/0342260 A1* | 11/2014 | Koyama | ............... | B60L 1/003 429/440 |
| 2015/0283978 A1* | 10/2015 | Miyakoshi | ............... | F25B 47/022 62/140 |
| 2015/0338134 A1* | 11/2015 | Taniguchi | ............... | B60H 1/143 62/160 |
| 2015/0377537 A1* | 12/2015 | West | ............... | F25B 13/00 62/115 |
| 2016/0185185 A1* | 6/2016 | Suzuki | ............... | B60H 1/0092 237/5 |
| 2016/0200171 A1* | 7/2016 | Nagasaka | ............... | B60H 1/00385 237/2 B |

FOREIGN PATENT DOCUMENTS

| | | |
|---|---|---|
| DE | 196 49 710 A1 | 6/1998 |
| DE | 10 2009 043 316 A1 | 3/2011 |
| DE | 10 2010 062 869 A1 | 6/2012 |
| DE | 10 2012 100 525 A1 | 1/2013 |
| DE | 10 2012 019 005 A1 | 4/2013 |
| DE | 10 2013 216 927 A1 | 3/2014 |
| DE | 10 2012 224 071 A1 | 6/2014 |
| DE | 10 2013 003 015 A1 | 8/2014 |
| EP | 1 251 020 A1 | 10/2002 |
| EP | 1 313 628 B1 | 10/2012 |
| WO | WO 2014/010218 A1 | 1/2014 |

OTHER PUBLICATIONS

German Search Report issued in German counterpart application No. 10 2014 217 959.9 dated May 6, 2015, with Statement of Relevancy (Twelve (12) pages).

Chinese Office Action issued in Chinese counterpart application No. 201580040503.4 dated Jul. 6, 2018, with partial English translation (Eighteen (18) pages).

German-language European Office Action issued in European counterpart application No. 15 754 191.3-1012 dated Dec. 9, 2019 (Five (5) pages).

* cited by examiner

METHOD AND AIR CONDITIONING UNIT FOR AIR CONDITIONING AN INTERIOR OF AN ELECTRICALLY DRIVEN VEHICLE

CROSS REFERENCE TO RELATED APPLICATIONS

This application is a continuation of PCT International Application No. PCT/EP2015/069206, filed Aug. 21, 2015, which claims priority under 35 U.S.C. § 119 from German Patent Application No. 10 2014 217 959.9, filed Sep. 9, 2014, the entire disclosures of which are herein expressly incorporated by reference.

BACKGROUND AND SUMMARY OF THE INVENTION

The present invention relates to a method and an air-conditioning device for the air-conditioning of an interior compartment of an electrically driven vehicle by way of the heat losses of an electric drive.

Motor vehicles which are operated purely electrically over relatively long periods of travel comprise electric heating devices for heating the interior compartment, because the heat losses of the electric drivetrain, for example of the battery (high-voltage battery), of the electric machine, of the power electronics, of the direct-current/direct-current converter and the like, are not sufficient, in all driving states, to heat the interior compartment of the motor vehicle. An additional electrical heating device of said type requires additional structural space, increases the costs of the motor vehicle, and increases the weight of the motor vehicle.

From DE 10 2012 019 005 A1, it is known to use the heat losses of the electric machine, and the electrical actuation thereof, for heating the interior compartment of a motor vehicle.

EP 1 313 628 B1 discloses the operation of an electric machine of a motor vehicle outside the optimum operating point for the purposes of increasing the waste heat for the temperature control of the interior compartment.

DE 10 2009 043 316 A1 discloses the use of a heat pump arrangement for the temperature control of the interior compartment of a motor vehicle.

The measures proposed in the prior art for the temperature control of the interior compartment of a motor vehicle having an electric drive are not optimal with regard to the overall efficiency.

It is an object of the invention to provide an improved method and an improved air-conditioning device for the temperature control of an interior compartment of a vehicle.

The method according to the invention for the temperature control of an interior compartment of a motor vehicle having an electric drive controls the temperature of the interior compartment by way of a heat pump arrangement having a heating temperature region and having a low-temperature region, wherein the heating temperature region comprises at least one interior compartment heat exchanger which is thermally coupled to the interior compartment, and the low-temperature region comprises an exterior heat exchanger and/or at least one heat exchanger which is arranged on a component of the electric drive. If the method determines that the interior compartment of the motor vehicle is to be temperature-controlled, heating energy of the heating temperature region of the heat pump arrangement is released to the interior compartment of the vehicle. The operating point of the electric drive is varied such that the generation of heat losses in at least one electrical component of the electric drive is controlled, whereby the temperature of the low-temperature region is, in steady-state or quasi-steady-state operation, controlled to a level which ensures that the heat pump arrangement can provide the heating energy. The required heating energy defines the temperature level that should prevail in the low-temperature region of the heat pump arrangement. The required energy level in the low-temperature region of the heat pump arrangement defines the operating point of the electric drive. In other words, if little heating energy is required and/or if the low-temperature region is at a high temperature, the electric drive is operated at an operating point which corresponds to the optimum operating point or which lies in the vicinity thereof. If the low-temperature region is at a temperature too low to generate the heating energy by way of the heat pump arrangement, the electric drive is operated at an operating point which is further remote from the optimum operating point.

In the context of this invention, an optimum operating point refers to an operating point at which the least possible thermal losses are generated in the electric drive and in the components thereof. The control of an electric drive and the selection of a suitable operating point are known to a person skilled in the art, as is the functioning of a heat pump and the configuration of controllers and regulating loops. Thus, for the sake of conciseness, a description of these will be omitted.

The method according to the invention for the temperature control of the interior compartment of the motor vehicle having the electric drive may comprise supplying heat of the heating temperature region of the heat pump to the interior compartment of the vehicle, if it is determined that the interior compartment of the motor vehicle is to be temperature-controlled. If components of the electric drive generate heat losses of a magnitude sufficient for the temperature control of the interior compartment of the motor vehicle, if at least one component of the electric drive is thermally coupled to a low-temperature region of the heat pump, the heat losses of at least one component of the electric drive are dissipated by way of the low-temperature region of the heat pump, wherein the temperature of the low-temperature region lies, in steady-state or quasi-steady-state operation, in the region of the temperature of the surroundings of the motor vehicle. In this way, the losses that arise when the thermal energy obtained from the heat losses is released to the surroundings of the motor vehicle are reduced.

If the components of the electric drive generate heat losses of a magnitude not sufficient for the temperature control of the interior compartment of the motor vehicle, if at least one component of the electric drive is thermally coupled to the low-temperature region of the heat pump, and if the exterior temperature is so high, and/or the air humidity so low, that there is no risk of function-impairing icing occurring in the region of the low-temperature region, the heat losses of at least one component of the electric drive are dissipated by way of the low-temperature region, wherein the temperature of the low-temperature region lies, in steady-state or quasi-steady-state operation, below the temperature of the surroundings of the vehicle. In this way, it is also possible for heat from the surroundings to be utilized for the temperature control of the interior compartment of the motor vehicle. The lower the temperature of the low-temperature region is, the more heat can be extracted from the surroundings. The temperature of the low-temperature region cannot be selected to be arbitrarily low, because otherwise there would be the risk of function-impairing icing in the region of the low-temperature region. Heat can be extracted from the surroundings by way of a low-temperature heat exchanger or exterior heat exchanger which is situated in the low-temperature region of the heat pump arrangement.

If the components of the electric drive generate heat losses of a magnitude not sufficient for the temperature control of the interior compartment of the motor vehicle, if at least one component is thermally coupled to a low-temperature region of a heat pump, and if the exterior temperature is so low, and/or the air humidity so high, that there is the risk of icing occurring in the region of the low-temperature region, the electric drive is actuated outside the optimum operating point such that the generation of heat losses in a first electrical component of the electric drive increases, and the heat losses generated by the first electrical component are dissipated by way of the low-temperature region of the heat pump arrangement. In this way, the temperature of the low-temperature region can be increased to such an extent that no heat or a little heat is absorbed at the exterior heat exchanger. In this way, it can be ensured that no icing occurs in the region of the low-temperature region or exterior heat exchanger, or the icing does not result in a restriction of function.

The method may be configured such that the fluid of the low-temperature region flows through the low-temperature heat exchanger or exterior heat exchanger, which exchanges heat with the exterior air, only when it is sought to extract heat from the surroundings of the motor vehicle. This is the case if the temperature of the fluid in the low-temperature region is lower than the ambient temperature. If the fluid of the low-temperature region does not flow through the low-temperature heat exchanger, icing is avoided, or a situation in which heat is released to the surroundings is avoided.

The electric drive has a battery, an electric machine which is supplied with current from the battery and which drives the motor vehicle, and a drive control device which controls the supply of current from the battery to the electric machine and/or which controls the charging of the battery with current generated by the electric machine. The drive control device may comprise a direct-current/direct-current converter with a multiplicity of power transistors, an intermediate circuit capacitor, plug connectors, lines, a semiconductor actuation means, capacitors, diodes and further passive components.

The heat pump arrangement may be actuated such that the temperature of the cooling medium of the at least one electrical component lies in the range of +/−10 K, preferably in the range of +/−5 K, around the temperature of the surroundings of the motor vehicle.

The method according to the invention has the advantage that the heat pump arrangement can extract heat not only from the at least one electrical component but also from the surroundings, because the temperature of the first electrical component lies in the region of the temperature of the surroundings. The at least one electrical component and the surroundings are thermally coupled to the low-temperature region of the heat pump arrangement. In the presence of a low exterior temperature below or in the vicinity of the freezing point, the temperature of the at least one electrical component can be kept above or slightly below the temperature of the surroundings of the motor vehicle, and it is thus possible for icing of the exterior heat exchanger to be avoided or reduced.

The low-temperature region may involve an evaporation of the fluid or coolant. Heat is extracted from the first electrical component and/or from the surroundings by way of the evaporating coolant or by way of a water-glycol circuit. Alternatively, the heat pump arrangement may release the generated heat directly, by way of an interior compartment heat exchanger, to the air that is conducted into the interior compartment of the vehicle. The heat pump arrangement may release the generated heat by way of a heat exchanger, which is thermally coupled to the heating temperature region, to a heating liquid which is conducted on at least one further heat exchanger which heats air which is conducted into the interior compartment of the vehicle. This arrangement relates to a liquid-liquid heat pump arrangement, wherein the heating temperature region uses a liquid medium, for example a mixture of glycol and water.

During steady-state or quasi-steady-state operation, the temperature of the first electrical component may, without any change of a parameter relating to the electric drive, vary only by an amount lower than a predetermined threshold value. The expression "steady-state or quasi-steady-state operation" corresponds to the thermally settled state. If no parameter, for example load, speed of the vehicle, inclination of the roadway, a control parameter of the electric machine, the trim, etc., is changed, the temperature of the first electrical component remains substantially constant and changes only by the threshold value. The threshold value may amount to up to +/−5 K, preferably up to +/−10 K. The expression "steady-state or quasi-steady-state operation" does not include the change of the temperature of the first electrical component in the event of a change of a parameter.

The method may furthermore comprise the step of monitoring the temperature of the cooling mechanism of the drive control device and the actuation of the electric drive such that the fluctuation of the temperature of the components of the drive control device is lower than a predetermined threshold value. In this way, it can be ensured that temperature fluctuations of the components of the drive control device are avoided, whereby the service life of the components of the drive control device, and of the drive control device as a whole, can be lengthened.

The method may furthermore have the step of providing current by way of the drive control device such that the ratio of the field-forming current id and the torque-forming current iq lies outside the optimum ratio, for the respective operating point, of the field-forming current id and the torque-forming current iq. In particular, the increase of the field-forming current id leads to greater power losses in the electrical components of the drive control device. By applying current which does not have the optimum ratio of the field-forming current id and the torque-forming current iq, both the temperature in the electric machine and the temperature of the components of the drive control device are increased.

The method may furthermore have the steps of actuating a brake of the motor vehicle and actuating the electric drive such that said electric drive is intended to move the motor vehicle. The parking brake supports the torque generated by the electric machine. This aspect of the invention is suitable for preconditioning of the interior compartment or for the heating of the interior compartment during a traffic-induced stoppage of the motor vehicle, for example at a traffic signal.

The method may furthermore have the step of actuating the drive control device such that only a field-forming current id is supplied to the electric machine. The field-forming current id does not contribute to the output of torque by the electric machine. Slight noises are generated because no rotation takes place. As a result of the application of direct current at a standstill, the continuous load capability of the electric machine and of the drive control device decreases. Owing to possible non-uniform heating, temperature sensors of the winding do not detect particularly hot points (hotspot). This step is possible for the preconditioning of the interior compartment when the motor vehicle is at a standstill, or during a traffic-induced stoppage of the motor vehicle.

The method may have the step of actuating the electric drive such that the drive control device actuates the electric machine such that a rotating field is generated in the electric machine without the axle of the electric machine rotating. The frequency of the rotating field may be of such a magnitude that it cannot effect a rotation of the axle of the electric machine, because too low a torque is generated. Said step is suitable for the preconditioning of the interior compartment of the motor vehicle and during a traffic-induced stoppage of the motor vehicle.

According to another aspect of the invention, the electric drive may, if the electric machine and/or the motor vehicle is at a standstill, be actuated such that the drive control device actuates the electric machine such that the electric machine generates a first torque in a first direction and subsequently generates a second torque in a second direction which is opposite to the first direction. The first torque and the second torque do not cause the motor vehicle to move away from the location at which it is situated. In order that no rotational movement of the drive wheel of the motor vehicle occurs, the regulation must rapidly reverse the torque direction. This aspect of the method may be used for the preconditioning of the interior compartment when the motor vehicle is parked or during traffic-induced stoppages. Furthermore, said mode of operation may be used during initial electric travel, that is to say after the vehicle has been parked for a relatively long period of time.

According to a further aspect, the invention comprises the actuation of the electric drive, if the vehicle is moving, such that the drive control device actuates the electric machine such that the electric machine generates a first superposition torque in the first direction and subsequently generates a second superposition torque in the second direction which is opposite to the first direction. The first superposition torque and the second superposition torque are superposed on a rotational movement of the electric machine. The motor vehicle is not accelerated and is not decelerated by the first superposition torque and the second superposition torque. According to a further aspect of the invention, if a gearbox of the motor vehicle is in neutral, such that no torque is transmitted from the electric machine to a drive wheel, the electric drive may be actuated such that the drive control device actuates the electric machine such that the electric machine generates a torque. This aspect of the invention can be used for the preconditioning of the interior compartment and for heating owing to a traffic-induced stoppage.

According to a further aspect of the invention, if the electric machine generates a torque for driving the vehicle, the electric drive can be actuated such that the drive control device supplies to the electric machine a field-forming current id higher than that required for the respective operating point at which the electric machine is operating. Specifically during starting, it is possible for heating to be performed with the maximum possible heating losses for a short time. The additional field-forming current id is superposed on the normal regulation.

According to a further aspect of the invention, if the electric machine generates current, the electric drive can be actuated such that a higher field-forming current id flows from the electric machine to the drive control device.

The invention also relates to a computer program product which, when loaded into a memory of a computer with a processor, carries out the steps of the method described above.

The invention also relates to an air-conditioning device for a motor vehicle having an electric drive which comprises a battery, a power device and an electric machine which is supplied with current from the battery and which drives the vehicle. The air-conditioning device furthermore comprises a heat pump arrangement having a low-temperature region, which is thermally coupled to at least one component of the electric drive and to the surroundings of the motor vehicle by way of an exterior heat exchanger, and having a heating temperature region, which is thermally coupled to the interior compartment of the motor vehicle by way of an interior compartment heat exchanger. The air-conditioning device is designed such that, if it is determined that the interior compartment of the motor vehicle is to be temperature-controlled, said air-conditioning device supplies heating energy of the heating temperature region of the heat pump arrangement to the interior compartment of the motor vehicle and selects the operating point of the electric drive such that the generation of heat losses in at least one electrical component of the electric drive is controlled, whereby the temperature of the low-temperature region is, in steady-state or quasi-steady-state operation, controlled to a level which ensures that the heat pump arrangement can provide the heating energy.

The device may be refined as described above with regard to the method. With regard to the advantages of the air-conditioning device, reference is made to the method.

The air-conditioning device may be designed such that, if the components of the electric drive generate heat losses of a magnitude sufficient for the temperature control of the interior compartment of the motor vehicle, said air-conditioning device dissipates the heat losses of at least one component of the electric drive by way of the low-temperature region of the heat pump arrangement, wherein the temperature of the low-temperature region lies, in steady-state or quasi-steady-state operation, in the region of the temperature of the surroundings of the motor vehicle. If the components of the electric drive generate heat losses of a magnitude not sufficient for the temperature control of the interior compartment of the motor vehicle, and if the exterior temperature is so high, and/or the air humidity so low, that there is no risk of icing occurring in the region of the low-temperature region, the heat losses of at least one component of the electric drive are dissipated by way of the low-temperature region of the heat pump arrangement, wherein the temperature of the low-temperature region lies, in steady-state or quasi-steady-state operation, below the temperature of the surroundings of the motor vehicle.

If the components of the electric drive generate heat losses of a magnitude not sufficient for the temperature control of the interior compartment of the motor vehicle, and if the exterior temperature is so low, and/or the air humidity so high, that there is the risk of icing occurring in the region of the low-temperature region, the electric drive is actuated by the air-conditioning device such that the generation of heat losses in a first electrical component of the electric drive increases. The heat losses generated by the first electrical component are dissipated by way of the low-temperature region of the heat pump arrangement and are subsequently supplied to the interior compartment. Furthermore, in the low-temperature region of the heat pump arrangement, there is situated a low-temperature heat exchanger which is in the form of a heat exchanger and which thermally couples the fluid to the surroundings. It is however also possible for no valves to be provided, and for the heat exchangers to be connected in series. The air-conditioning device may be refined as described above with regard to the method.

The invention also relates to a motor vehicle having the air-conditioning device described above.

The invention will now be discussed with reference to the appended figure, which shows an exemplary and non-restrictive embodiment of the invention, wherein Other objects, advantages and novel features of the present invention will become apparent from the following detailed description of one or more preferred embodiments when considered in conjunction with the accompanying drawings.

DETAILED DESCRIPTION OF THE DRAWINGS

The present invention may be used in vehicles which have only an electric drive or which have a so-called hybrid drive with an internal combustion engine and an electric machine for driving the motor vehicle.

Figure 1:
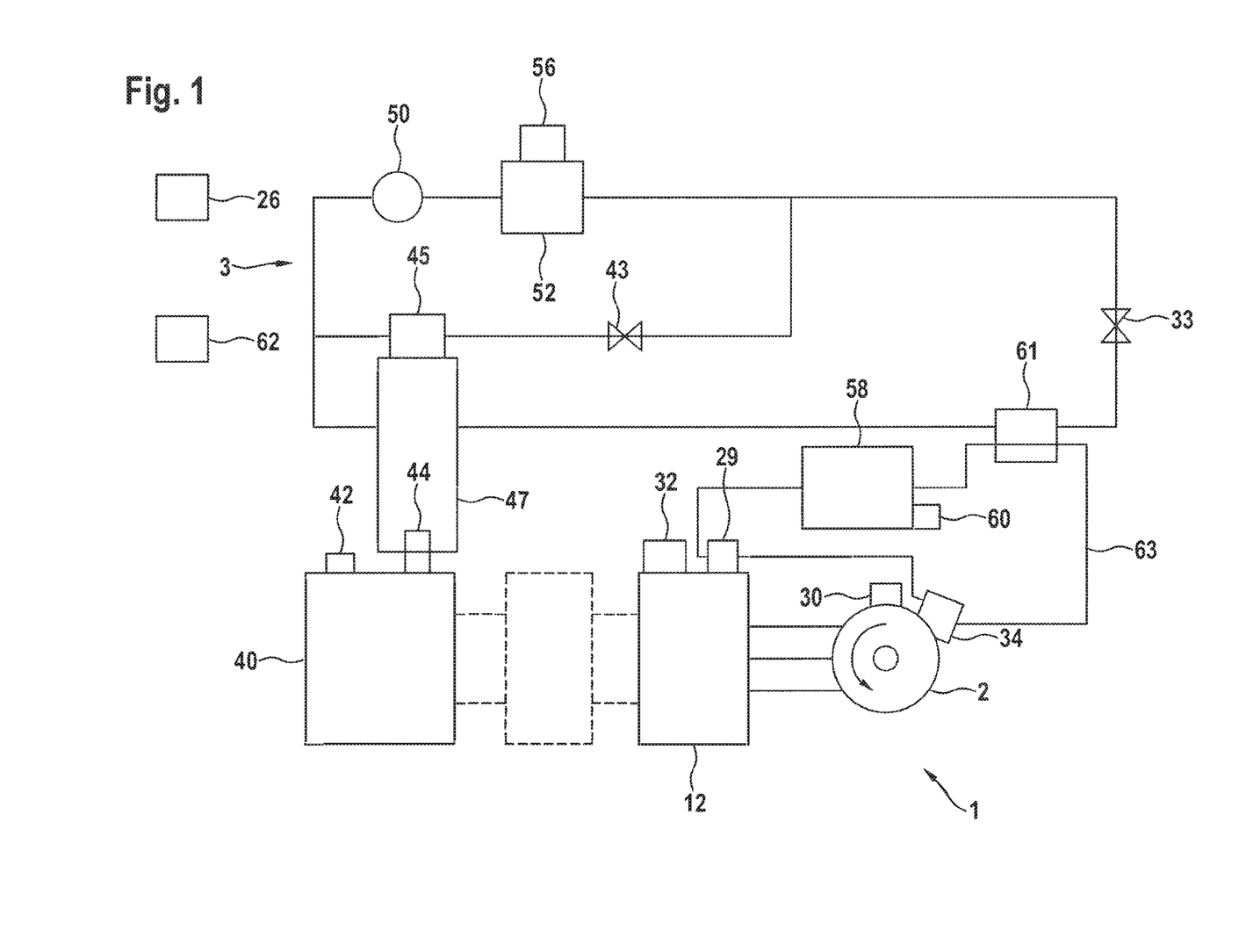
FIG. 1 shows a schematic circuit diagram of a temperature-control system for the temperature control of an interior compartment of a vehicle, having a heat pump arrangement.

Reference is made to FIG. 1, which shows a schematic circuit diagram of a temperature-control system for the temperature control of the interior compartment of the vehicle. An electric machine 2 is connected to a power device 12. The power device 12 is connected by way of optional additional components (not shown) to a battery 40. During operation, the battery 40, the power device 12 and the electric machine 2 may warm up. The temperature and/or power of the battery 40 is determined by way of at least one sensor 42, the temperature and/or power of the power device 12 is determined by way of at least one sensor 32, and the temperature and/or power of the electric machine 2 is determined by way of at least one sensor 30. The determined temperatures may be transmitted to an air-conditioning control device 26 in order to supply input data for the regulation of the temperature of the interior compartment and the regulation of the temperature of the components of the electric drive. The cooling of the power device 12 is realized by way of a first heat exchanger 29, which is flowed through by a first cooling fluid of a first cooling circuit 63 and which extracts heat from the power device 12. The cooling of the electric machine 2 is performed by way of a second heat exchanger 34, which is flowed through by the first cooling fluid of a first cooling circuit 63 and which dissipates heat losses generated by the electric machine 2. The battery 40 is cooled by way of a third heat exchanger 44, which is flowed through by a second cooling fluid and which dissipates the heat losses generated by the battery 40 by way of the second cooling circuit 47, or which realizes temperature control of said battery in the presence of low exterior temperatures. A fourth heat exchanger 58, which is in the form of a low-temperature heat exchanger or exterior heat exchanger and which is arranged in the first cooling circuit 63, extracts heat from the surroundings or releases heat to the surroundings. The heat exchangers 29, 34 and 58 are situated in a low-temperature region of a circuit of a heat pump arrangement.

The first cooling circuit 63 is coupled to a first evaporator 61. The second cooling circuit 47 is thermally coupled to a second evaporator 45. Alternatively, the battery 40 may also be cooled directly by way of an evaporator of the heat pump circuit 3, without an interposed fluid circuit.

The heat pump circuit 3 comprises a compressor 50 which compresses the fluid passing from the evaporators 45, 61, whereby the temperature of said fluid is increased. The fluid may, after flowing through the evaporators 45, 61, be predominantly in a gaseous state. After the compression by way of the compressor 50, the fluid may still be in a gaseous state.

After the compression, the cooling fluid flows to an interior heat exchanger 52. In the interior heat exchanger 52, the compressed cooling fluid cools and releases its heat to air in a line 56 which supplies the air to the interior compartment of a vehicle for the temperature control of the interior compartment. The interior heat exchanger 52 operates as a condenser or gas cooler. The interior heat exchanger 52 may alternatively also release the heat to a further fluid circuit, which then heats the air for the interior compartment by way of a further heat exchanger (not shown in this embodiment).

The cooled cooling fluid flows in liquid form to the expansion valves 33 and 43. In said expansion valves, the pressure of the cooling fluid is reduced, and the coolant flow is distributed, as required, between the evaporators 45 and 61. The cooling fluid then flows to the evaporators 45, 61, in which the liquid cooling fluid evaporates.

A first expansion valve 33 controls the quantity of coolant supplied to the first evaporator 61 and thus the temperature of the first cooling circuit 63 and the temperatures of the components contained therein. A second valve 43 controls the quantity of coolant supplied to the second evaporator 45 and thus the temperature of the second cooling circuit 47. In this way, the battery 40 can be temperature-controlled. It is also possible for the temperature control of the battery to be performed in the presence of low exterior temperatures (not shown in this embodiment).

Furthermore, yet further evaporators may be situated in the heat pump circuit 3, which further evaporators serve, for example, for cooling the inlet air for the interior compartment (not shown in this embodiment).

The mode of operation of a heat pump arrangement is otherwise known to a person skilled in the art and does not need to be described in more detail here.

The air-conditioning control device 26 controls the mode of operation of the first expansion valve 33, of the compressor 50 and of the electric drive 1 in order to realize temperature control of the interior compartment of the vehicle. In particular, the air-conditioning control device 26 controls the mode of operation of the components of the motor vehicle in a manner dependent on the ambient conditions and in a manner dependent on the demand for heat for the interior compartment of the motor vehicle. If the air-conditioning control device 26 determines that the interior compartment of the motor vehicle is to be temperature-controlled, that is to say heat is to be supplied to the interior compartment, heat is supplied to the interior compartment by way of the interior heat exchanger 52 and the line 56. Subsequently, the air-conditioning control device 26 checks, by way of the sensors 30, 32, 60, the amount of heat that can be extracted from the electric drive 1 or from the components 2, 12 thereof and/or from the exterior heat exchanger 58. If heat losses of a magnitude sufficient for the temperature control of the interior compartment of the motor vehicle can be extracted from the electric machine 2 and/or from the power device 12, the air-conditioning control device 26 actuates the heat pump arrangement and the first expansion valve 33 such that heat is extracted from the respective component of the electric drive 1 in order to supply said heat as heating energy to the interior compartment by way of the heat pump arrangement. Here, the temperature of the low-temperature region, that is to say the temperature of the first heat exchanger 29 of the power device 12, the temperature of the second heat exchanger 34 of the electric machine 2 and/or the temperature of the fourth heat exchanger 48, lies in the region of the exterior temperature, which encompasses a temperature range of approximately +/−10 K, preferably of approximately +/−5 K. This operating situation arises if a relatively high power is demanded of the electric machine 2.

If the air-conditioning control device 26 determines, by way of the sensor 30 arranged on the electric machine 2, by way of the sensor 32 arranged on the power device 12, by way of the sensor 60 arranged on the fourth heat exchanger 58 and/or by way of the exterior temperature sensor 62, that the heat losses of the components of the electric drive 1, for example of the electric machine 2, of the power device 12 or the like, are not sufficient to supply heat to the interior compartment by way of the compressor 50, the air-conditioning control device 26 actuates the compressor 50 and the first expansion valve 33 such that the temperature in the low-temperature region, that is to say in the region of the heat exchangers 29, 34, 58, lies below the temperature of the surroundings. This mode of operation is preferable if there is no risk of icing occurring at the heat exchangers 29, 34, 58 or at other components of the motor vehicle. Furthermore, said mode of operation may arise if relatively low power is demanded of the electric drive 1, 2, 12. Heat is thus absorbed from the surroundings. It is self-evident that, when taking into consideration the risk of icing of one of the components, consideration must be given to the exterior temperature, the air humidity, snowfall, slush, droplet formation or the like. In the context of this invention, a small amount of icing, which does not impair the functionality of the motor vehicle, is tolerated.

If the air-conditioning control device 26 determines that the interior compartment must be temperature-controlled by way of the interior compartment heat exchanger 52, and if it is determined by way of the exterior temperature sensor 62 that there is the risk of icing of the fourth heat exchanger 58 in particular, the air-conditioning control device 26 commands the electric drive 1 and the components thereof, that is to say the power device 12 and/or the electric machine 2, to operate outside the optimum operating point in order to generate heat losses of a greater magnitude. The heat losses are extracted by way of the heat pump arrangement, in particular by way of the mode of operation of the compressor 50, from the electric machine 2, from the power device 12 and/or from the fourth heat exchanger 58 in order to supply heat to the interior compartment after the compression of the fluid by way of the compressor 50. This mode of operation of the motor vehicle is necessary if exterior temperatures in the region of the freezing point prevail, for example in the presence of exterior temperatures in the range below 5° C., preferably below 2° C.

Normally, a heat pump arrangement is regulated such that the temperature of the exterior heat exchanger, which in the embodiments described corresponds to the fourth heat exchanger 58, is as low as possible in order to extract the greatest possible amount of heat from the surroundings. This approach is not possible in the case of the regulation of an air-conditioning system of a motor vehicle, because, owing to air humidity, snowfall or spray water, there is the risk of the exterior heat exchanger, that is to say the fourth heat exchanger 58, icing up, and/or of other components of the electric drive 1 icing up.

In the embodiment illustrated in FIG. 1, the first cooling fluid flows in the first cooling circuit 63 through the first heat exchanger 29, through the second heat exchanger 34 and through the fourth heat exchanger 58 in a series sequence. It is however also possible for the heat exchangers to be flowed through in parallel.

Figure 2:
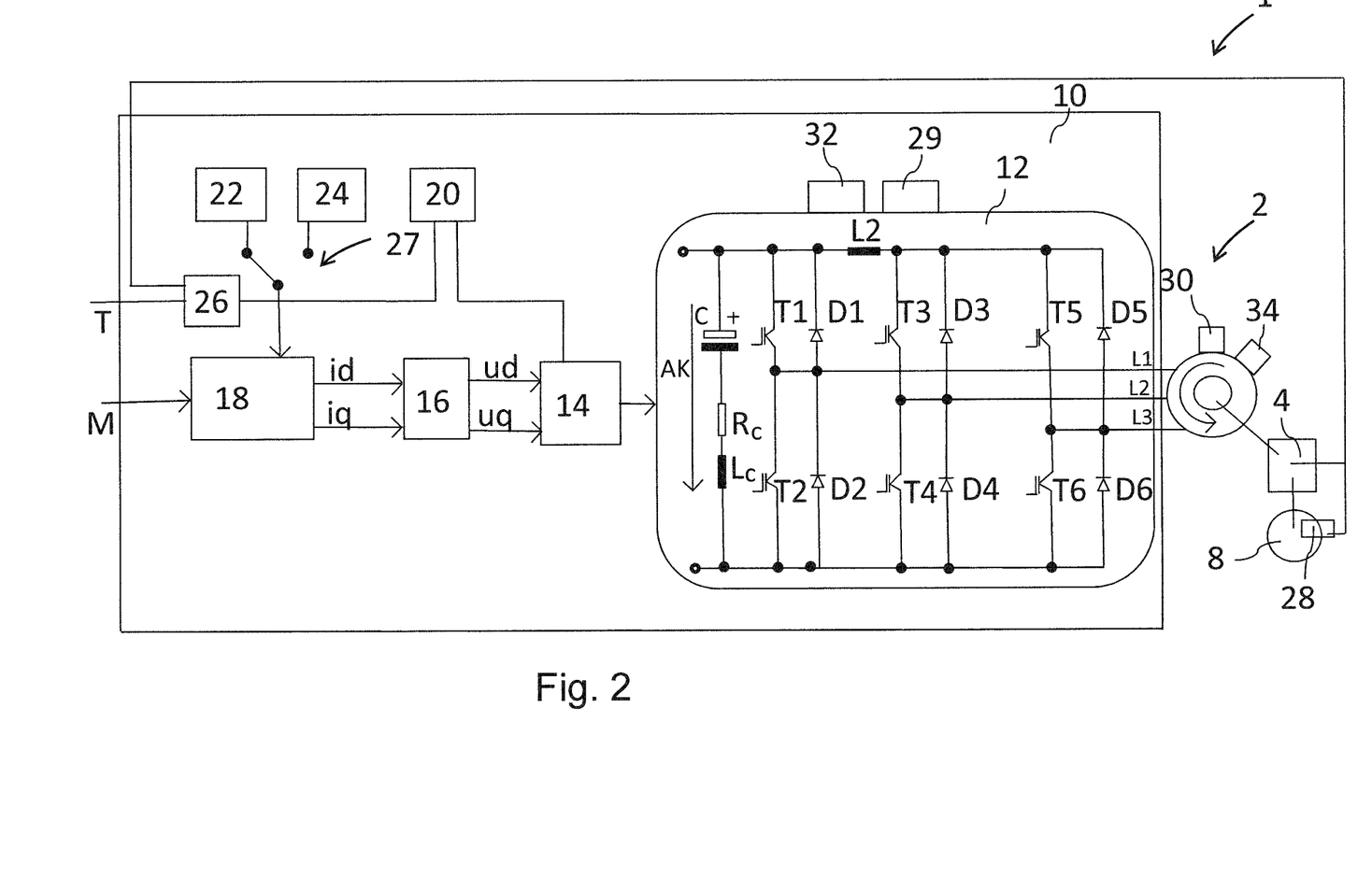
FIG. 2 shows a schematic circuit diagram of an exemplary electric drive.

FIG. 2 shows a schematic circuit diagram of a vehicle having an electric drive, which uses the teachings of the present invention. The vehicle comprises the electric machine 2, which can both output a drive torque and generate a braking torque in a generator mode. The electric machine 2 is connected to an optional gearbox 4 which drives a drive wheel 8 which makes contact with a roadway. The gearbox 4 may have at least one traction gear, in the case of which the electric machine 2 is coupled to the drive wheel 8, and one neutral position, in the case of which the electric machine 2 is not coupled to the drive wheel 8. The electric drive furthermore comprises a drive control device 10 which has the power device 12, a pulse-width-modulation device 14, a current regulating device 16, a torque regulating device 18, a switching frequency selection device 20, a table for an optimum field current 22, a table for a trimmed field current 24, and an air-conditioning control device 26.

The mode of operation of the drive control device 10, insofar as it is not already known to a person skilled in the art, will be discussed below. An accelerator pedal and/or a speed regulating device (not shown) predefine a setpoint torque M for the torque regulating device 18. The torque regulating device generates a setpoint value for a field-forming current id and a setpoint value for a torque-forming current iq, which are transmitted to the current regulating device. The current regulating device determines, from the setpoint value for the field-forming current id and the setpoint value for the torque-forming current iq, a setpoint value for a field-forming voltage ud and a setpoint value for a torque-forming voltage uq, which are transmitted to the pulse-width-modulation device 14. The pulse-width-modulation device 14 generates control signals for power transistors T1, T2, T3, T4, T5, T6 of a power device 12. The construction and mode of operation of the power device 12 are known to a person skilled in the art and do not need to be discussed in any more detail. The outputs of the power transistors T1-T6 are connected to three windings of the electric machine 2. If the electric machine 2 generates a torque for driving the motor vehicle, a current flows from the power device 12 to the electric machine. If the electric machine 2 generates a braking torque, a current flows from the electric machine 2 to the power device 12.

The drive control device 10 furthermore comprises a table 22 for an optimum current angle β of field-forming current and torque-forming current. If it is not intended for the electric drive 1 to generate any additional heat losses, the torque regulating device 18 reads the optimum current angle for the respective operating point from the table 22 for an optimum field current. Furthermore, the switching frequency device 20 of the pulse-width-modulation device 14 predefines the optimum switching frequency of the power transistors T1-T6. In the presence of a low rotational speed of the electric machine 2, the switching frequency device 20 predefines a low switching frequency for the generation of the supporting points of the substantially sinusoidal current signals for the supply to the electric machine. The low switching frequency may be approximately 5 kHz. If the electric machine 2 is rotating at a relatively high rotational speed, the switching frequency device 20 predefines a relatively high switching frequency for the power transistors T1-T6, whereby more supporting points for the substantially sinusoidal current that is supplied to the electric machine 2 are generated.

The mode of operation of the drive control device 10 in the event of additional heat losses being demanded for the temperature control of the interior compartment of the motor vehicle will be discussed below. The air-conditioning control device 26 may have the effect that the current angle β of field-generating current id and torque-generating current iq is changed. For example, additional field-generating current id can be generated. If additional heat losses are to be generated, a switching device 27 is switched such that the torque regulating device 18 reads the setpoint value for an optimum current angle β for the respective operating point from the table 24 for a trimmed field-forming current id. In general, it is the case that the heat losses generated by an electric drive 1 are proportional to the square of the current. As a result of the higher field-forming current id, the power losses of the electric drive 1 are increased, specifically proportionally to the square of the increase of the field-forming current id.

The air-conditioning control device 26 may actuate a brake 28 of the motor vehicle, and actuate the electric machine 2 by way of the power device 12 such that said electric machine is intended to move the motor vehicle. In this way, additional heat losses are generated.

The air-conditioning control device 26 may actuate the power device 12 such that only a field-forming current id is supplied to the electric machine, whereby additional heat losses are generated.

The air-conditioning control device 26 may actuate the electric machine 2 by way of the power device 12 such that an electrical rotating field is generated without the axle of the electric machine 2 rotating, such that additional heat losses are generated. This may be realized for example by way of an electrical field with a relatively high angle frequency.

If the motor vehicle is at a standstill, the air-conditioning control device 26 actuates the electric machine 2 by way of the power device 12 such that the electric machine generates a first torque in a first direction and subsequently generates a second torque in a second direction which is opposite to the first direction. The first torque and the second torque do not cause the motor vehicle to move away from the location at which it is situated. In this way, too, it is possible for additional heat losses to be generated.

If the motor vehicle is moving, the air-conditioning control device 26 may actuate the electric machine by way of the power device 12 such that the electric machine generates a first superposition torque in the first direction and subsequently generates a second superposition torque in the second direction which is opposite to the first direction. The first superposition torque and the second superposition torque are superposed on a rotational movement of the electric machine 2. The motor vehicle is not accelerated and is not decelerated by the first superposition torque and the second superposition torque. The superposition torque may be a torque which is superposed when the electric machine 2 is driving the motor vehicle. In this way, too, additional heat losses are generated.

If the gearbox 4 of the motor vehicle is in neutral, such that no torque is transmitted from the electric machine 2 to a drive wheel 8, the air-conditioning control device 26 may actuate the electric drive 2 by way of the power device 12 such that the electric machine 2 generates a torque. In this way, too, additional heat losses are generated.

If the electric machine generates a torque for driving the motor vehicle, the air-conditioning control device 26 may actuate the electric machine 2 by way of the power device 12 such that there is supplied to the electric machine 2 a field-forming current id higher than that required for the respective operating point. In this way, too, additional heat losses are generated.

If the electric machine 2 generates current, the air-conditioning control device 26 may, by way of the power device 12, have the effect that a higher field-forming current id flows from the electric machine to the power device 12. In this way, more heat losses can be generated during the recuperation mode and/or generator mode. By way of such trimming, it is possible for mechanical energy, that is to say braking energy, to be accepted without energy being conducted into the accumulator. This may lead to a reduction of the thermal load and/or of the wear of the mechanical brake (disk brake, drum brake).

The air-conditioning control device 26 or some other control device of the motor vehicle may actuate the electric drive 1 such that, if the state of charge of the battery prevents an acceptance of charge or acceptance of current, the optimum operating point of the electric machine 2, of the drive control device 10 and/or of the power device 12 is deviated from such that deceleration without mechanical wear is still possible, and the heat losses generated in the electric drive 1 in the process can be used for the air-conditioning of the interior compartment.

It is most effective for a cooling fluid to be able to be heated by way of losses in the stator. It is here that the lowest heat transfer losses of the heat losses generated in the stator plate owing to the iron losses arise. Furthermore, the heat losses in the stator winding can be dissipated in an efficient manner. The heat losses in the rotor can be dissipated only to a limited extent, or slowly, by way of the stator cooling owing to the insulating air gap. Cooling of the electric machine 2 may be realized by way of a second heat exchanger 34 which is arranged in and/or on the lamination assemblies and/or through and/or on the windings of the electric machine 2. A person skilled in the art is familiar with such fluid cooling, and such fluid cooling will therefore, for the sake of conciseness, not be described in any more detail.

The present invention has the advantage that heat for heating the interior compartment of an electrically driven vehicle can be generated without the need for additional components. In this way, the production outlay and the mass of the electrically driven motor vehicle can be reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for the temperature control of an interior compartment of a motor vehicle having an electric drive by way of a heat pump arrangement having a heating temperature region and having a low-temperature region, wherein the heating temperature region comprises at least one interior compartment heat exchanger which is thermally coupled to the interior compartment, and the low-temperature region comprises at least one of an exterior heat exchanger and a heat exchanger arranged on an electrical component of the electric drive, wherein the method comprises the acts of:

making a first determination as to whether, at an operating point of the electric drive, heat losses generated by the electric drive are sufficient to generate heating energy that satisfies a demand for heating the interior compartment making a second determination as to whether, based on at least one of the exterior temperature and the air humidity, there is a risk of function-impairing icing occurring in the region of the low-temperature region, supplying heating energy of the heating temperature region of the heat pump arrangement to the interior compartment of the vehicle in response to the demand that the interior compartment of the motor vehicle is to be temperature-controlled; and varying the operating point of the electric drive based on the first and second determinations, so as to control the generation of the heat losses such that the temperature of the low-temperature region is, in steady-state or quasi-steady-state operation, controlled to a level which ensures that the heat pump arrangement can provide sufficient heating energy to satisfy the demand that the interior compartment be temperature controlled.

2. The method as claimed in claim 1, wherein, in the event components of the electric drive generate heat losses of a magnitude sufficient to generate the heating energy by way of the heat pump arrangement that satisfies the demand, the method further comprises:

dissipating the heat losses of the component of the electric drive by way of the low-temperature region of the heat pump arrangement, wherein the temperature of the low-temperature region lies, in steady-state or quasi-steady-state operation, in the region of the temperature of the surroundings of the motor vehicle, and the electric drive is operated in the region of the optimum operating point; and in the event the electric drive generates heat losses of a magnitude not sufficient to generate the heating energy by way of the heat pump arrangement that satisfies the demand, and if, based on at least one of the exterior temperature and the air humidity, it is determined that there is no risk of function-impairing icing occurring in the region of the low-temperature region, the method further comprises:

dissipating the heat losses of the component of the electric drive by way of the low-temperature region of the heat pump arrangement; and extracting heat energy from the surroundings by way of the exterior heat exchanger, wherein the temperature of the low-temperature region lies, in steady-state or quasi-steady-state operation, below the temperature of the surroundings of the motor vehicle, and the electric drive is operated in the region of the optimum operating point.

3. The method as claimed in claim 1, wherein, in the event the electric drive generates, during operation at the optimum operating point, heat losses of a magnitude not sufficient to generate the heating energy by way of the heat pump arrangement that satisfies the demand, and if, based on at least one of the exterior temperature and the air humidity, it is determined that there is a risk of function-impairing icing occurring in the region of the low-temperature region, the method further comprises:

actuating the electric drive outside the optimum operating point such that at least one first electrical component of the electric drive generates, in steady-state or quasi-steady-state operation, heat losses such that the heat pump arrangement can generate the heating energy; and dissipating the heat losses generated by the at least one first electrical component by way of the low-temperature region of the heat pump arrangement.

4. The method as claimed in claim 2, wherein, in the event the electric drive generates, during operation at the optimum operating point, heat losses of a magnitude not sufficient to generate the heating energy by way of the heat pump arrangement that satisfies the demand, and if, based on at least one of the exterior temperature and the air humidity, it is determined that there is a risk of function-impairing icing occurring in the region of the low-temperature region, the method further comprises:

actuating the electric drive outside the optimum operating point such that at least one first electrical component of the electric drive generates, in steady-state or quasi-steady-state operation, heat losses such that the heat pump arrangement can generate the heating energy; and dissipating the heat losses generated by the at least one first electrical component by way of the low-temperature region of the heat pump arrangement.

5. The method as claimed in claim 1, wherein the electric drive comprises:

a battery, an electric machine which is supplied with current from the battery and which drives the motor vehicle, and a drive control device which controls the supply of current from the battery to the electric machine and/or which controls the charging of the battery with current generated by the electric machine.

6. The method as claimed in claim 1, wherein the heat pump arrangement is actuated such that the temperature of the low-temperature region lies in the range of approximately +/−5 K around a temperature of the surroundings of the motor vehicle.

7. The method as claimed in claim 1, wherein, with respect to the generation of heat losses, the method further comprises:

providing current by way of the drive control device such that a ratio of a field-forming current and a torque-forming current lies outside an optimum ratio, for the respective operating point, of the field-forming current and the torque-forming current.

8. The method as claimed in claim 2, wherein, with respect to the generation of heat losses, the method further comprises:

providing current by way of the drive control device such that a ratio of a field-forming current and a torque-forming current lies outside an optimum ratio, for the respective operating point, of the field-forming current and the torque-forming current.

9. The method as claimed in claim 3, wherein, with respect to the generation of heat losses, the method further comprises:

providing current by way of the drive control device such that a ratio of a field-forming current and a torque-forming current lies outside an optimum ratio, for the respective operating point, of the field-forming current and the torque-forming current.

10. The method as claimed in claim 1, wherein, with respect to the generation of heat losses, the method comprises:

actuating a brake of the motor vehicle and actuating the electric drive such that said electric drive is intended to move the motor vehicle;

actuating the drive control device such that only a field-forming current id is supplied to the electric machine;

actuating the electric drive such that the drive control device actuates the electric machine such that a rotating field is generated in the electric machine, without the axle of the electric machine rotating;

in the event the motor vehicle is at a standstill, the method further comprises actuating the electric drive such that the drive control device actuates the electric machine such that the electric machine generates a first torque in a first direction and subsequently generates a second torque in a second direction which is opposite to the first direction, wherein the first torque and the second torque do not cause the motor vehicle to move away from the location at which it is situated;

in the event the motor vehicle is moving, the method further comprises actuating the electric drive such that the drive control device actuates the electric machine such that the electric machine generates a first superposition torque in the first direction and subsequently generates a second superposition torque in the second direction which is opposite to the first direction, wherein the first superposition torque and the second superposition torque are superposed on a rotational movement of the electric machine, and the motor vehicle is not accelerated and is not decelerated by the first superposition torque and the second superposition torque;

in the event a gearbox of the motor vehicle is in neutral, such that no torque is transmitted from the electric machine to a drive wheel, the method further comprises actuating the electric drive such that the drive control device actuates the electric machine such that the electric machine generates a torque;

in the event the electric machine generates a torque for driving the motor vehicle, the method further comprises actuating the electric drive such that the drive control device supplies to the electric machine a field-forming current higher than that required for the respective operating point; and in the event the electric machine generates current, the method further comprises actuating the electric drive such that a higher field-forming current flows from the electric machine to the drive control device.

11. An air-conditioning device for a motor vehicle having an electric drive, which comprises a battery, a power device and an electric machine that is supplied with current from the battery and drives the motor vehicle, the air-conditioning device comprising:

a heat pump arrangement having a low-temperature region, which is thermally coupled to at least one component of the electric drive and to the surroundings of the motor vehicle by way of an exterior heat exchanger, and having a heating temperature region, which is thermally coupled to the interior compartment of the motor vehicle by way of an interior compartment heat exchanger, and a control unit configured to:

control the heat pump arrangement to supply heating energy of the heating temperature region of the heat pump arrangement to the interior compartment of the motor vehicle in response to a demand that the interior compartment be temperature controlled;

make a first determination as to whether, at an operating point of the electric drive, heat losses generated by the electric drive are sufficient to generate heating energy to satisfy the demand for heating the interior compartment make a second determination as to whether, based on at least one of the exterior temperature and the air humidity, there is a risk of function-impairing icing occurring in the region of the low-temperature region and vary the operating point of the electric drive based on the first and second determinations, so as to control the generation of heat losses such that the temperature of the low-temperature region is, in steady-state or quasi-steady-state operation, controlled to a level which ensures that the heat pump arrangement can provide sufficient heating energy to satisfy the demand for heating the interior compartment.

12. The air-conditioning device as claimed in claim 11, wherein the air-conditioning device is configured such that, in the event that the electric drive generates heat losses of a magnitude sufficient to generate the heating energy by way of the heat pump arrangement that satisfies the demand, said air-conditioning device dissipates the heat losses of the component of the electric drive by way of the low-temperature region of the heat pump arrangement, wherein the temperature of the low-temperature region lies, in steady-state or quasi-steady-state operation, in the region of the temperature of the surroundings of the motor vehicle, and the electric drive is operated in the region of the optimum operating point; and in the event the electric drive generates heat losses of a magnitude not sufficient to generate the heating energy by way of the heat pump arrangement that satisfies the demand, and if, based on at least one of the exterior temperature and air humidity, it is determined that there is no risk of function-impairing icing occurring in the region of the low-temperature region, said air-conditioning device dissipates the heat losses of the component of the electric drive by way of the low-temperature region of the heat pump arrangement, wherein the temperature of the low-temperature region lies, in steady-state or quasi-steady-state operation, below the temperature of the surroundings of the motor vehicle, and the electric drive is operated in the region of the optimum operating point.

13. The air-conditioning device as claimed in claim 11, wherein the air-conditioning device is configured such that, in the event the electric drive generates heat losses of a magnitude not sufficient to generate the heating energy by way of the heat pump arrangement that satisfies the demand, and if, based on at least one of the exterior temperature and the air humidity, it is determined that there is the risk of function-impairing icing occurring in the region of the low-temperature region, said air-conditioning device actuates the electric drive outside the optimum operating point such that at least one first electrical component of the electric drive generates, in steady-state or quasi-steady-state operation, heat losses such that the heat pump arrangement can generate the heating energy, and said air-conditioning device dissipates the heat losses generated by the at least one first electrical component by way of the low-temperature region of the heat pump arrangement.

14. The air-conditioning device as claimed in claim 12, wherein the air-conditioning device is configured such that, in the event the electric drive generates heat losses of a magnitude not sufficient to generate the heating energy by way of the heat pump arrangement that satisfies the demand, and if, based on at least one of the exterior temperature and the air humidity, it is determined that there is the risk of function-impairing icing occurring in the region of the low-temperature region, said air-conditioning device actuates the electric drive outside the optimum operating point such that at least one first electrical component of the electric drive generates, in steady-state or quasi-steady-state operation, heat losses such that the heat pump arrangement can generate the heating energy, and said air-conditioning device dissipates the heat losses generated by the at least one first electrical component by way of the low-temperature region of the heat pump arrangement.

\* \* \* \* \*